Feb. 27, 1973  J. L. GOODMAN  3,718,527
APPARATUS FOR IMPREGNATING FIBER REINFORCEMENTS
WITH HARDENABLE RESIN
Filed Sept. 3, 1968  2 Sheets-Sheet 1

INVENTOR.
JAMES L. GOODMAN

United States Patent Office 3,718,527
Patented Feb. 27, 1973

3,718,527
APPARATUS FOR IMPREGNATING FIBER REINFORCEMENTS WITH HARDENABLE RESIN
James L. Goodman, Bristol, Tenn., assignor to Morrison Molded Fiber Glass Company, Bristol, Va.
Filed Sept. 3, 1968, Ser. No. 756,895
Int. Cl. B32b 31/08; D04h 3/12
U.S. Cl. 156—381                                9 Claims

ABSTRACT OF THE DISCLOSURE

Apparatus for practicing the method of the invention includes a closed chamber into which partially impregnated material is introduced and wherein additional resin flows. A pressure plate at the exit end of the chamber compresses the resin impregnated material to spread the resin more completely throughout the material and to prevent excess resin from exuding from the chamber.

Additional dry filamentary material may be applied to the resin impregnated filamentary material prior to entering a resin curing zone.

BACKGROUND OF THE INVENTION

The production of filament reinforced resin products such as panels, structural shapes, rods, and the like from fiber glass mat material or roving requires thorough impregnation of the mat or roving material. Heretofore, fiber glass mat material has been drawn through a bath of liquid resin and the wetted fiber reinforcements are then drawn through a forming device or die. Excess resin accumulating at the entrance of the forming device or die is collected and returned to the source of supply.

The fiber reinforcements usually are not thoroughly impregnated with resin applied in this manner and there is frequently a high percentage of voids in the finished product, the voids being a measure of the amount of air entrapped in the resin as it is being cured. Various ways and means have been proposed to try to eliminate or to drastically reduce the percentage of voids in fiber reinforced resin products and the amount of excess resin that accumulates. That the various methods and apparatus available in the prior art have not been entirely satisfactory is quite apparent. Those skilled in the art will recognize, however, from the following description that the method and apparatus of the present invention effectively reduces the percentage of voids in finished fiber reinforced resin articles.

SUMMARY OF THE INVENTION

Filament reinforcements that are partially wet with liquid resin pass through a closed chamber into which additional resin flows and wherein the filament reinforcements are compressed to thoroughly impregnate the reinforcements and to remove excess resin from the reinforcements as they emerge from the chamber.

For a further understanding of the invention and for advantages and features thereof reference may be made to the following description taken in conjunction with the drawings which show for the purpose of exemplification a preferred embodiment and a modification of the invention.

DETAILED DESCRIPTION

Figure 1:
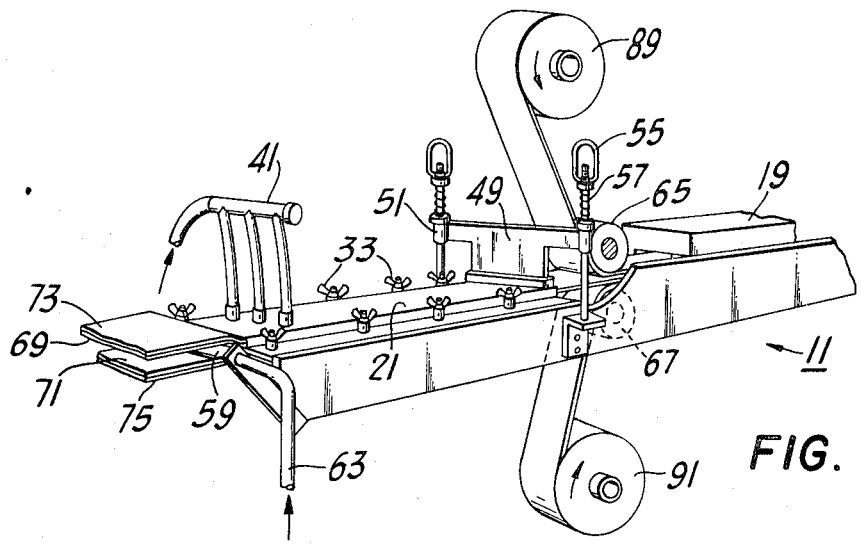
FIG. 1 is a schematic perspective view of apparatus in accordance with the invention that is suitable for carrying into practice the method of the invention.
Figure 2:
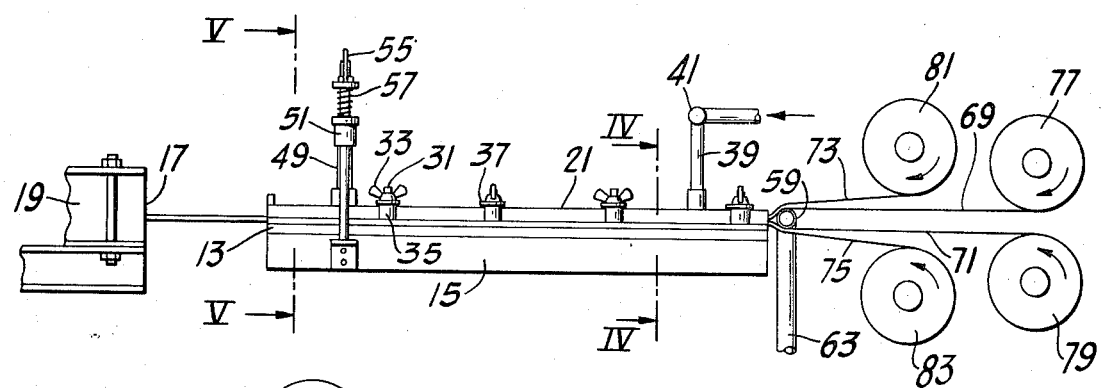
FIG. 2 is a schematic longitudinal elevational view of the apparatus of FIG. 1 viewed from the far side thereof.

The apparatus 11 of FIGS. 1 and 2 includes a flat relatively thick base plate 13 of rectangular shape that may be mounted in any suitable manner to a support frame or foundation 15 located adjacent the entrance end 17 of a forming device or die 19. The die 19 may be of any well known type, such as the forming device or die disclosed in application Ser. No. 115,633, filed June 8, 1961, wherein resin impregnated mat material or filament rovings are heated to cure the resin and form within the die a filament reinforced resin product.

To the base plate 13 is mounted a formed and dished cover member 21 having flanges 23, 25 along the long sides of the rectangular base plate 13, and an end closure 27 at each end, having therein elongate apertures 29 extending substantially the width of the end closure 27.

The formed and dished cover member 21 is secured to the base plate 13 by means of a plurality of spaced apart studs 31 and wing nuts 33, with a sleeve 35 surrounding the stud 31 and the washer 37 being situated between the sleeve 35 and the wing nut 33. Of course, other suitable fastening means may be used if preferred.

The formed and dished cover member 21 is provided at one end with a plurality of tubes 39 that connect to a common header 41 through which liquid resin flows into the chamber 43 formed between the dished cover member 21 and the base plate 13.

Adjacent the opposite end of the formed and dished cover member 21 there are spaced apart vertical side members 45 with ends 47 forming a slide box of rectangular construction in which a generally rectangular pressure plate 49 moves vertically.

The pressure plate 49 is provided with vertically oriented tubular members 51 at the outer extremities of the upper edge of the pressure plate 49, and these tubular members 51 fit over and slide vertically on vertical sutds 53 mounted to the support frame or foundation 15. The upper end portion of each stud 53 is threaded to receive a nut 55 that bears against a compression spring 57 interposed between the nut 55 and the tubular member 51 which spring 57 urges the pressure plate 49 downward.

The lower end of the pressure plate 49 is rounded so as to eliminate any sharp corners that might damage fiber glass matting or rovings moving through the pressure chamber 43 and moving between the pressure plate 49 and the base plate 13.

Close by the entrance end closure 27, there is mounted in the horizontal direction, extending substantially the width of the entrance opening, a tubular conduit 59, in the top and bottom portion of which there are a plurality of inline perforations 61. The perforations 61 may be round holes or elongate slots as desired that allow resin flowing in the conduit 59 to exude therefrom; the conduit 59 being connected to a resin supply conduit 63 in communication with a source of resin (not shown).

Figure 3:
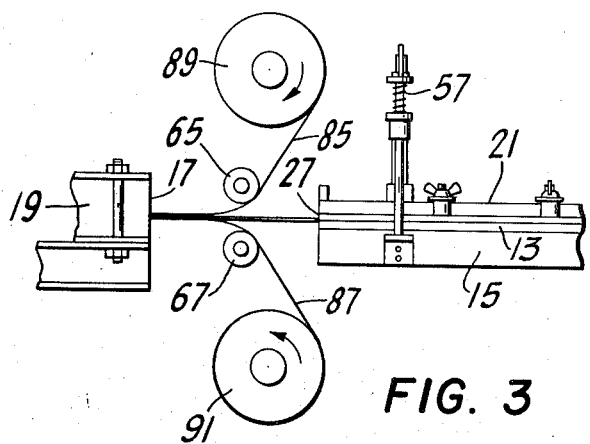
FIG. 3 is a modification of the apparatus of FIG. 1.

FIG. 3 illustrates a modification of the structure of FIG. 1, which modification includes a pair of horizontal guide rods 65, 67, located in vertical spaced apart relation between the entrance end 17 of the forming device or die 19 and the exit end closure 27 of the formed cover member 21. In all other respects, the structure of FIG. 2 is substantially identical with that of FIG. 1.

Figure 4:
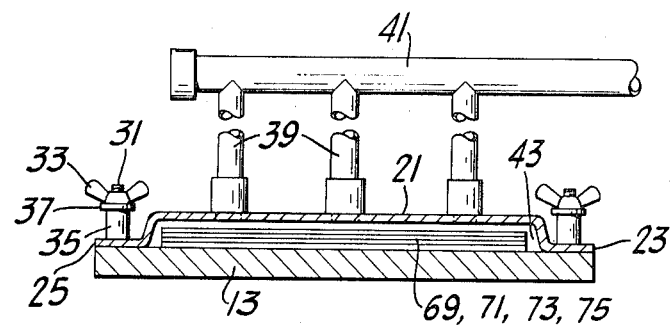
FIG. 4 is a sectional view along line IV—IV of FIG. 2.
Figure 5:
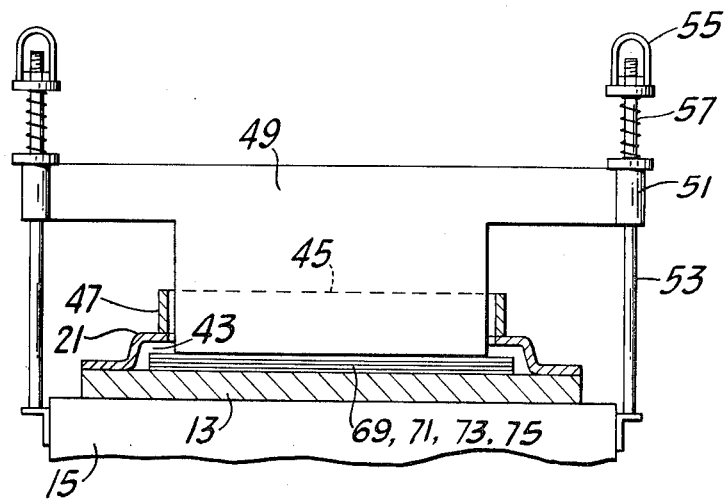
FIG. 5 is a sectional view along line V—V of FIG. 2.
Figure 6:
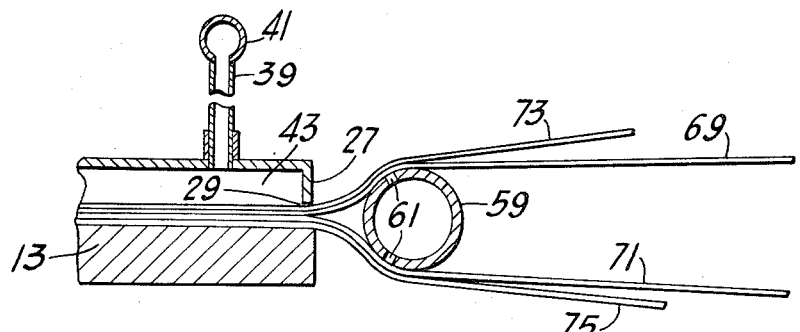
FIG. 6 is a detail of a portion of the apparatus of FIG. 1.

In operation, a plurality of glass fiber mats 69, 71, 73, 75, four for example, lead from supply spools 77, 79, 81, 83, mounted conveniently to the apparatus 11, about as shown in FIGS. 1 and 2. The mats 69, 73 are generally superimposed and lead over the top of the horizontal conduit 59, while the other mats 71, 75 are also superimposed and lead underneath the conduit 59. The four mats 69, 71, 73, 75, then, are superimposed as they enter the entrance opening 29 and pass through the chamber 43. Within the chamber 43, the four mats 69, 71, 73, 75, arranged in the overlying manner shown in FIG. 4, pass between the lower edge of the pressure plate 49 and the base plate 13; the pressure plate 49 acting as a squeegee to spread the resin throughout the mats, and to prevent excess resin from being carried with the mats through the exit opening 29 of the chamber 43.

As the mats 69, 71, 73, 75 pass over and under the perforated conduit 59, the resin flows from the holes 61 and soaks the two mats 67, 71 in contact with the conduit 59. Since the mats are porous, some of the resin permeates the inner mats 69, 71 and, to a limited extent, soaks the two outer mats 73, 75; but most of the resin is confined to the two inner mats 69, 71.

As the four superimposed mats 69, 71, 73, 75 enter the chamber 43 a small amount of additional resin, flowing through the conduits 41 and 39, flows onto the four mats. The four mats 69, 71, 73, 75 then pass under the rounded lower edge of the pressure plate 49 and, due to the pressure exerted on the pressure plate 49 by the springs 57, the four mats are compressed.

The action of the pressure plate 49 in compressing the four mats is to spread the resin throughout the mat structures so that they are thoroughly impregnated with resin to a degree not heretofore attainable. It will be recognized by those skilled in the art that the pressure plate 49 also serves as a squeegee and a gate to prevent the outflow of excess resin on the surface of the mats as they emerge from the chamber 43.

When the mats enter the chamber 43, the two plies 69, 71 have most of the resin in them since the resin flowing from the perforations 61 contacts these two plies first. Within the chamber 43, however, additional resin coats the top and bottom plies 73, 75. But, the pressure plate 49 compresses the plies and spreads the resin throughout the mat plies, in a manner that thoroughly impregnates the plies.

The compressed mats 69, 71, 73, 75, emerge from the chamber 43 and then enter the entrance end 17 of the forming device or die 19 wherein the resin is heated and cured to form a fiber reinforced resin sheet or article.

In some instances it may be desirable to apply one or more additional outer plies of fiber mat or roving to the resin impregnated mat structure or rovings emerging from the chamber 43, before the structure enters the forming device or die 19. In this instance, FIG. 3 illustrates how two additional plies of dry fiber mat or rovings 85, 87, leading from supply spools 89, 91 mounted above and below the compressed structure, are added to the top and bottom surfaces of the compressed resin impregnated structure just before the structure enters the forming device or die 19. The additional mats or rovings 85, 87 pass under and over the guide rods 65, 67 respectively as shown in FIG. 3.

The degree of resin impregnation of the mats controlled by the pressure at which the resin flows into the chamber 43 and the pressure exerted on the pressure plate 49 by the springs 57.

It is a feature of the invention that the superimposed mats are more thoroughly impregnated with resin due to the pressure applied by the pressure plate of the invention.

It is a feature of the invention that the pressure plate and resin impregnation chamber reduce the amount of excess resin that would be carried by the mat structure and that would be lost at the entrance end of the forming device or die.

It is a feature of the invention that the resin impregnated mats emerging from the impregnating device of the invention move more rapidly through the forming device or die, thereby increasing the speed of production of products.

It is a feature of the invention that flat fiber mat structures are more thoroughly impregnated with resin the device of the invention and thereafter they may be readily shaped as they enter the forming device or die.

Although the invention has been described herein with a certain degree of particularity, it is understood that the present disclosure has been made only as an example and that the scope of the invention is defined by what is hereinafter claimed.

What is claimed is:

1. Apparatus for impregnating fiber reinforcements with resin comprising:
   (a) a closed chamber having an entrance and exit through which said fiber reinforcements pass;
   (b) means to wet said fiber reinforcements with resin before they enter said chamber; and
   (c) adjustable means within said chamber to compress said fiber reinforcements whereby said resin thoroughly impregnates said fiber reinforcements and excess resin remains within said chamber.

2. The invention of claim 1 wherein:
   (a) said means to wet said fiber reinforcements includes a perforated conduit contacting said fiber reinforcements from which resin carried therein exudes onto said fiber reinforcements.

3. The invention of claim 1 including:
   (a) means to introduce resin into said chamber at a location adjacent the entrance end thereof.

4. The invention of claim 1 wherein:
   (a) said means to compress said fiber reinforcements includes a pressure plate bearing on said reinforcements; and
   (b) resilient means urges said pressure plate into contact with said reinforcements so as to compress them.

5. The invention of claim 1 including:
   (a) means to add additional reinforcements to the compressed resin impregnated reinforcement emerging from said chamber before they enter a curing zone.

6. Apparatus for impregnating fiber reinforcements with resin comprising:
   (a) a base plate member;
   (b) a cover secured to said base plate member and forming therewith a chamber having axially aligned entrance and exit openings;
   (c) a first conduit mounted adjacent the entrance opening having perforations therein;
   (d) means for flowing a liquid resin in said first conduit whereby resin emerges from said perforations;
   (e) a second conduit carrying resin into said chamber at a location adjacent said entrance opening;
   (f) a pressure plate disposed across said chamber and substantially perpendicular to the axes of said entrance and said exit openings;
   (g) means to lead said fiber reinforcement material into the entrance opening of said chamber in such a manner that resin emerging from said perforations contacts said reinforcements and is carried by the reinforcements into said chamber;
   (h) resilient means urging said pressure plate toward and into contact with the reinforcements passing between said pressure plate and said base plate member, said reinforcements being compressed between said pressure plate and said base plate whereby said resin is distributed through said reinforcements and said reinforcements are thoroughly impregnated with resin; and
   (i) means to move said reinforcements continually through said apparatus.

7. The invention of claim 6 including:
   (a) means to add additional fiber reinforcements to those emerging from said chamber.

8. Apparatus for producing an integral assembly of resin impregnated filament reinforcings comprising:

(a) first means for superimposing first filament reinforcements upon second filament reinforcements to form a first ply;

(b) second means for superimposing third filament reinforcements upon fourth filament reinforcements to form a second ply;

(c) means for applying a bonding resin to the outer surface of said first ply that is juxtaposed toward the outer surface of said second ply;

(d) means for bringing together the opposed surfaces of said first and second plies upon which the resin has been applied to form an assembly of superimposed plies with resin in the interior thereof; and (e) means for compressing said assembly of plies to force said resin from the interior of said ply outwardly through said plies to impregnate the filament reinforcements of both said plies.

9. Apparatus for producing an integral assembly of resin impregnated filament reinforcings comprising:

(a) means for superimposing first filament reinforcements upon second filament reinforcements;

(b) means to apply a bonding resin to the juxtaposed surfaces of said filament reinforcements;

(c) a closed zone through which said reinforcements pass; and (d) adjustable means for compressing said first and second filament reinforcings in said zone to force said resin outwardly to impregnate the filament reinforcements with said resin.

References Cited

UNITED STATES PATENTS

| | | | |
|---|---|---|---|
| Re. 24,804 | 3/1900 | Shorts | 156—85 |
| 3,032,459 | 5/1962 | Uhleen | 156—322 X |
| 2,258,659 | 10/1941 | Mosler, Jr. | 156—500 X |
| 3,086,904 | 4/1963 | Uhleen | 156—549 X |
| 3,483,071 | 12/1969 | Frick et al. | 156—382 X |
| 3,042,569 | 7/1962 | Paul | 156—180 X |
| 3,079,978 | 3/1963 | Cobb, Jr. et al. | 156—180 X |
| 3,533,870 | 10/1970 | Mackay et al. | 156—286 X |

SAMUEL FEINBERG, Primary Examiner

J. J. DEVITT, Assistant Examiner

U.S. Cl. X.R.

156—180, 286